US012591144B2

(12) United States Patent
Small et al.

(10) Patent No.: US 12,591,144 B2
(45) Date of Patent: Mar. 31, 2026

(54) OPTICAL FIDUCIAL GENERATION FOR GALVANOMETRIC SCANNER CALIBRATION

(71) Applicant: nLIGHT, Inc., Camas, WA (US)

(72) Inventors: Jay Small, Camas, WA (US); Robert J. Martinsen, West Linn, OR (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 18/636,766

(22) Filed: Apr. 16, 2024

(65) Prior Publication Data

US 2024/0264457 A1      Aug. 8, 2024

Related U.S. Application Data

(60) Division of application No. 17/501,932, filed on Oct. 14, 2021, now Pat. No. 11,982,819, which is a
(Continued)

(51) Int. Cl.
| | | |
|---|---|---|
| *G02B 27/32* | (2006.01) | |
| *B22F 10/28* | (2021.01) | |
(Continued)

(52) U.S. Cl.
CPC .............. *G02B 27/32* (2013.01); *B22F 10/28* (2021.01); *B22F 10/31* (2021.01); *B22F 12/44* (2021.01);
(Continued)

(58) Field of Classification Search
CPC ........ G02B 27/32; B33Y 10/00; B33Y 30/00; B33Y 50/02; B22F 10/31; B22F 12/44; B22F 12/49; B22F 12/90; B22F 10/28
See application file for complete search history.

(56) References Cited

U.S. PATENT DOCUMENTS

| | | |
|---|---|---|
| 3,388,461 A | 6/1968 | Lins |
| 4,315,666 A | 2/1982 | Hicks, Jr. |
| (Continued) | | |

FOREIGN PATENT DOCUMENTS

| | | |
|---|---|---|
| CA | 2292974 A1 | 6/2000 |
| CN | 1217030 C | 8/2005 |
| (Continued) | | |

OTHER PUBLICATIONS

Chung, "Solution-Processed Flexible Transparent Conductors Composed of Silver Nanowire Networks Embedded in Indimn Tin Oxide Nanoparticle Matrices," Nano Research, 10 pages (Sep. 24, 2012).
(Continued)

*Primary Examiner* — Nahida Sultana
(74) *Attorney, Agent, or Firm* — Wiley Rein LLP

(57) ABSTRACT

A method includes producing a fiducial source beam with an optical source, and forming at least one transient optical fiducial on a laser processing target that is in a field of view of a laser scanner situated to scan a laser processing beam across the laser processing target, with an optical fiducial pattern generator that receives the fiducial source beam, to adjust a positioning of the laser processing beam relative to the at least one transient optical fiducial.

4 Claims, 7 Drawing Sheets

Related U.S. Application Data continuation of application No. 15/945,550, filed on Apr. 4, 2018, now Pat. No. 11,173,548.

(60) Provisional application No. 62/481,637, filed on Apr. 4, 2017.

(51) Int. Cl.

| | |
|---|---|
| *B22F 10/31* | (2021.01) |
| *B22F 12/44* | (2021.01) |
| *B22F 12/49* | (2021.01) |
| *B22F 12/90* | (2021.01) |
| *B33Y 10/00* | (2015.01) |
| *B33Y 30/00* | (2015.01) |
| *B33Y 50/02* | (2015.01) |

(52) U.S. Cl.
CPC ............. *B22F 12/49* (2021.01); *B22F 12/90* (2021.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 4,713,518 | A | 12/1987 | Yamazaki et al. |
| 4,863,538 | A | 9/1989 | Deckard |
| 4,953,947 | A | 9/1990 | Bhagavatula |
| 5,008,555 | A | 4/1991 | Mundy |
| 5,082,349 | A | 1/1992 | Cordova-Plaza et al. |
| 5,129,014 | A | 7/1992 | Bloomberg |
| 5,252,991 | A | 10/1993 | Storlie et al. |
| 5,430,666 | A * | 7/1995 | DeAngelis ............. B33Y 30/00 |
| | | | 73/1.01 |
| 5,509,597 | A | 4/1996 | Laferriere |
| 5,523,543 | A | 6/1996 | Hunter, Jr. et al. |
| 5,566,196 | A | 10/1996 | Scifres |
| 5,642,198 | A | 6/1997 | Long |
| 5,719,386 | A | 2/1998 | Hsieh et al. |
| 5,832,415 | A | 11/1998 | Wilkening et al. |
| 5,837,962 | A | 11/1998 | Overbeck |
| 5,841,465 | A | 11/1998 | Fukunaga et al. |
| 5,932,119 | A | 8/1999 | Kaplan et al. |
| 6,192,171 | B1 | 2/2001 | Goodman et al. |
| 6,275,630 | B1 | 8/2001 | Yang et al. |
| RE37,585 | E | 3/2002 | Mourou et al. |
| 6,353,203 | B1 | 3/2002 | Hokodate et al. |
| 6,360,042 | B1 | 3/2002 | Long |
| 6,362,004 | B1 | 3/2002 | Noblett |
| 6,426,840 | B1 | 7/2002 | Partanen et al. |
| 6,434,302 | B1 | 8/2002 | Fidric et al. |
| 6,477,301 | B1 | 11/2002 | Anthon et al. |
| 6,490,376 | B1 | 12/2002 | Au et al. |
| 6,577,314 | B1 | 6/2003 | Yoshida et al. |
| 6,600,149 | B2 | 7/2003 | Schulz et al. |
| 7,151,788 | B2 | 12/2006 | Imakado et al. |
| 7,196,339 | B2 | 3/2007 | Namba et al. |
| 7,231,063 | B2 | 6/2007 | Naimark et al. |
| 7,349,123 | B2 | 3/2008 | Clarke et al. |
| 7,437,041 | B2 | 10/2008 | Po |
| 7,622,710 | B2 | 11/2009 | Gluckstad |
| 7,628,865 | B2 | 12/2009 | Singh |
| 7,781,778 | B2 | 8/2010 | Moon et al. |
| 8,071,912 | B2 | 12/2011 | Costin, Sr. et al. |
| 8,237,788 | B2 | 8/2012 | Cooper et al. |
| 8,251,475 | B2 | 8/2012 | Murray et al. |
| 8,269,108 | B2 | 9/2012 | Kunishi et al. |
| 8,288,679 | B2 | 10/2012 | Unrath |
| 8,310,009 | B2 | 11/2012 | Saran et al. |
| 8,404,998 | B2 | 3/2013 | Unrath et al. |
| 8,414,264 | B2 | 4/2013 | Bolms et al. |
| 8,415,613 | B2 | 4/2013 | Heyn et al. |
| 8,442,303 | B2 | 5/2013 | Cheng et al. |
| 8,472,099 | B2 | 6/2013 | Fujino et al. |
| 8,809,734 | B2 | 8/2014 | Cordingley et al. |
| 8,958,144 | B2 | 2/2015 | Rataj et al. |

| | | | |
|---|---|---|---|
| 9,200,887 | B2 | 12/2015 | Potsaid et al. |
| 9,537,042 | B2 | 1/2017 | Dittli et al. |
| 10,048,661 | B2 | 8/2018 | Arthur et al. |
| 10,112,262 | B2 | 10/2018 | Cheverton et al. |
| 10,207,489 | B2 | 2/2019 | Dave et al. |
| 10,214,833 | B1 | 2/2019 | Kaehr et al. |
| 10,295,820 | B2 | 5/2019 | Small et al. |
| 10,363,705 | B1 | 7/2019 | Marsch et al. |
| 10,646,963 | B2 | 5/2020 | Victor et al. |
| 10,656,427 | B2 | 5/2020 | Rivera et al. |
| 10,656,440 | B2 | 5/2020 | Kliner et al. |
| 10,663,767 | B2 | 5/2020 | Kliner et al. |
| 10,670,872 | B2 | 6/2020 | Karlsen et al. |
| 10,705,348 | B2 | 7/2020 | Martinsen et al. |
| 10,730,785 | B2 | 8/2020 | Brown et al. |
| 10,751,834 | B2 | 8/2020 | Koponen et al. |
| 10,971,885 | B2 | 4/2021 | Kliner |
| 11,135,680 | B2 | 10/2021 | Wuest et al. |
| 2001/0045149 | A1 | 11/2001 | Granger |
| 2001/0050364 | A1 | 12/2001 | Tanaka et al. |
| 2003/0001743 | A1 | 1/2003 | Menard |
| 2003/0174387 | A1 | 9/2003 | Eggleton et al. |
| 2003/0213998 | A1 | 11/2003 | Hsu et al. |
| 2004/0031779 | A1 | 2/2004 | Cahill et al. |
| 2004/0112634 | A1 | 6/2004 | Tanaka et al. |
| 2004/0152233 | A1 | 8/2004 | Nemets et al. |
| 2004/0207936 | A1 | 10/2004 | Yamamoto et al. |
| 2004/0247222 | A1 | 12/2004 | Park |
| 2005/0067394 | A1 | 3/2005 | Vaidyanathan et al. |
| 2005/0168847 | A1 | 8/2005 | Sasaki |
| 2005/0191017 | A1 | 9/2005 | Croteau et al. |
| 2005/0205778 | A1 * | 9/2005 | Kitai ................... B23K 26/364 |
| | | | 250/309 |
| 2005/0233557 | A1 | 10/2005 | Tanaka et al. |
| 2006/0215976 | A1 | 9/2006 | Singh et al. |
| 2006/0275705 | A1 | 12/2006 | Dorogy et al. |
| 2007/0047940 | A1 | 3/2007 | Matsumoto et al. |
| 2007/0075060 | A1 | 4/2007 | Shedlov et al. |
| 2007/0206900 | A1 | 9/2007 | Po |
| 2007/0251543 | A1 | 11/2007 | Singh |
| 2008/0231939 | A1 | 9/2008 | Gluckstad |
| 2008/0246024 | A1 | 10/2008 | Touwslager et al. |
| 2008/0251504 | A1 | 10/2008 | Lu et al. |
| 2009/0122377 | A1 | 5/2009 | Wagner |
| 2009/0202191 | A1 | 8/2009 | Ramachandran |
| 2009/0257621 | A1 | 10/2009 | Silver |
| 2009/0274833 | A1 | 11/2009 | Li et al. |
| 2009/0297140 | A1 | 12/2009 | Heismann et al. |
| 2009/0314752 | A1 | 12/2009 | Manens et al. |
| 2009/0324233 | A1 | 12/2009 | Samartsev et al. |
| 2010/0025387 | A1 | 2/2010 | Arai et al. |
| 2010/0150201 | A1 | 6/2010 | Shin et al. |
| 2010/0225974 | A1 | 9/2010 | Sandström |
| 2010/0230665 | A1 | 9/2010 | Verschuren et al. |
| 2010/0251437 | A1 | 9/2010 | Heyn et al. |
| 2010/0252543 | A1 | 10/2010 | Manens et al. |
| 2010/0257641 | A1 | 10/2010 | Perkins et al. |
| 2010/0326969 | A1 | 12/2010 | Tsukamoto et al. |
| 2011/0080476 | A1 | 4/2011 | Dinauer et al. |
| 2011/0127697 | A1 | 6/2011 | Milne |
| 2011/0133365 | A1 | 6/2011 | Ushimaru et al. |
| 2011/0187025 | A1 | 8/2011 | Costin, Sr. |
| 2011/0278277 | A1 | 11/2011 | Stork Genannt Wersborg |
| 2011/0279826 | A1 | 11/2011 | Miura et al. |
| 2012/0009511 | A1 | 1/2012 | Dmitriev |
| 2012/0127097 | A1 | 5/2012 | Gaynor et al. |
| 2012/0145685 | A1 | 6/2012 | Ream et al. |
| 2012/0148823 | A1 | 6/2012 | Chu |
| 2012/0156458 | A1 | 6/2012 | Chu |
| 2012/0295071 | A1 | 11/2012 | Sato et al. |
| 2012/0301733 | A1 | 11/2012 | Eckert et al. |
| 2012/0301737 | A1 | 11/2012 | Labelle et al. |
| 2013/0005139 | A1 | 1/2013 | Krasnov et al. |
| 2013/0022754 | A1 | 1/2013 | Bennett et al. |
| 2013/0023086 | A1 | 1/2013 | Chikama et al. |
| 2013/0027648 | A1 | 1/2013 | Moriwaki |
| 2013/0044768 | A1 | 2/2013 | Ter-Mikirtychev |
| 2013/0095260 | A1 | 4/2013 | Bovatsek et al. |
| 2013/0134637 | A1 | 5/2013 | Wiesner et al. |

(56) References Cited

U.S. PATENT DOCUMENTS

| | | | |
|---|---|---|---|
| 2013/0186871 A1 | 7/2013 | Suzuki et al. | |
| 2013/0228442 A1 | 9/2013 | Mohaptatra et al. | |
| 2013/0294728 A1 | 11/2013 | Rockwell | |
| 2013/0299468 A1 | 11/2013 | Unrath et al. | |
| 2014/0104618 A1 | 4/2014 | Potsaid et al. | |
| 2014/0155873 A1 | 6/2014 | Bor | |
| 2014/0259589 A1 | 9/2014 | Xu et al. | |
| 2014/0327687 A1 | 11/2014 | Murakami | |
| 2014/0332254 A1 | 11/2014 | Pellerite et al. | |
| 2014/0333931 A1 | 11/2014 | Lu et al. | |
| 2015/0086159 A1 | 3/2015 | Salokatve et al. | |
| 2015/0100149 A1* | 4/2015 | Coeck | G01S 5/16 |
| | | | 700/120 |
| 2015/0165556 A1 | 6/2015 | Jones et al. | |
| 2015/0253487 A1 | 9/2015 | Nichol et al. | |
| 2015/0276783 A1 | 10/2015 | Palella et al. | |
| 2015/0314612 A1 | 11/2015 | Balasini et al. | |
| 2015/0346483 A1 | 12/2015 | Ehrmann | |
| 2015/0352664 A1 | 12/2015 | Errico et al. | |
| 2016/0059354 A1 | 3/2016 | Sercel et al. | |
| 2016/0116679 A1 | 4/2016 | Muendel et al. | |
| 2016/0158889 A1 | 6/2016 | Carter et al. | |
| 2016/0175935 A1 | 6/2016 | Ladewig et al. | |
| 2016/0179064 A1 | 6/2016 | Arthur et al. | |
| 2016/0184893 A1* | 6/2016 | Dave | B29C 64/393 |
| | | | 419/53 |
| 2016/0185048 A1 | 6/2016 | Dave et al. | |
| 2016/0187646 A1 | 6/2016 | Ehrmann | |
| 2016/0196072 A1 | 7/2016 | Smith | |
| 2016/0288254 A1* | 10/2016 | Pettit | B23K 26/0626 |
| 2016/0303793 A1* | 10/2016 | Ermoshkin | B29C 64/129 |
| 2017/0028618 A1* | 2/2017 | Robeson | B29C 64/129 |
| 2017/0036299 A1 | 2/2017 | Goya et al. | |
| 2017/0087766 A1* | 3/2017 | Chung | G01N 33/5058 |
| 2017/0090462 A1 | 3/2017 | Dave et al. | |
| 2017/0173737 A1* | 6/2017 | Gray | B33Y 50/02 |
| 2017/0355132 A1* | 12/2017 | Moore | B29C 35/02 |
| 2018/0009162 A1* | 1/2018 | Moore | B33Y 70/00 |
| 2018/0065186 A1* | 3/2018 | Cullinan | H01L 23/4985 |
| 2018/0117219 A1* | 5/2018 | Yang | B29C 41/22 |
| 2018/0154484 A1 | 6/2018 | Hall | |
| 2018/0264719 A1* | 9/2018 | Rolland | G03F 7/16 |
| 2018/0281067 A1 | 10/2018 | Small et al. | |
| 2018/0326485 A1 | 11/2018 | Brown | |
| 2019/0077086 A1 | 3/2019 | Stengel et al. | |
| 2019/0118481 A1 | 4/2019 | Brown | |
| 2019/0217422 A1 | 7/2019 | Kramer et al. | |
| 2019/0250398 A1 | 8/2019 | Small et al. | |
| 2019/0270161 A1* | 9/2019 | Allenberg-Rabe | B33Y 10/00 |
| 2019/0375010 A1 | 12/2019 | Richardson | |
| 2020/0001396 A1 | 1/2020 | Brown et al. | |
| 2020/0078884 A1 | 3/2020 | Nie et al. | |
| 2020/0251237 A1 | 8/2020 | Gross | |
| 2020/0263978 A1 | 8/2020 | Pieger et al. | |
| 2020/0333640 A1 | 10/2020 | Kliner et al. | |
| 2021/0016394 A1 | 1/2021 | McCarthy et al. | |
| 2021/0252658 A1 | 8/2021 | Gaffigan | |
| 2022/0168960 A1 | 6/2022 | Muller | |
| 2024/0042691 A1* | 2/2024 | Buls | B22F 12/90 |
| 2024/0269746 A1* | 8/2024 | Chaudhary | B29C 64/393 |

FOREIGN PATENT DOCUMENTS

| | | | |
|---|---|---|---|
| CN | 1926460 A | 3/2007 | |
| CN | 1966224 A | 5/2007 | |
| CN | 101071926 A | 11/2007 | |
| CN | 101133351 A | 2/2008 | |
| CN | 101143405 A | 3/2008 | |
| CN | 101303269 A | 11/2008 | |
| CN | 101314196 A | 12/2008 | |
| CN | 101403822 A | 4/2009 | |
| CN | 101733561 A | 6/2010 | |
| CN | 101821081 A | 9/2010 | |
| CN | 101836309 A | 9/2010 | |
| CN | 201783759 U | 4/2011 | |
| CN | 102084282 A | 6/2011 | |
| CN | 102176104 A | 9/2011 | |
| CN | 102207618 A | 10/2011 | |
| CN | 102289072 A | 12/2011 | |
| CN | 102301200 A | 12/2011 | |
| CN | 102241740 A | 5/2012 | |
| CN | 102448623 A | 5/2012 | |
| CN | 102549377 A | 7/2012 | |
| CN | 102582274 A | 7/2012 | |
| CN | 102640026 A | 8/2012 | |
| CN | 104475970 A | 4/2015 | |
| CN | 104704821 A | 6/2015 | |
| CN | 104759623 A | 7/2015 | |
| CN | 105163894 A | 12/2015 | |
| CN | 105290610 A | 2/2016 | |
| CN | 105365215 A | 3/2016 | |
| CN | 105682900 A | 6/2016 | |
| CN | 105965015 A | 9/2016 | |
| CN | 106163703 A | 11/2016 | |
| CN | 106163774 A | 11/2016 | |
| CN | 106180712 A | 12/2016 | |
| CN | 106312567 A | 1/2017 | |
| DE | 4437284 A1 | 11/1998 | |
| DE | 203 20 269 U1 | 4/2004 | |
| DE | 202016004237 U1 | 8/2016 | |
| DE | 102015103127 A1 | 9/2016 | |
| EP | 0048855 A2 | 4/1982 | |
| EP | 1238745 A2 | 9/2002 | |
| EP | 1974848 A1 | 10/2008 | |
| EP | 2587564 A1 | 5/2013 | |
| EP | 2642246 A2 | 9/2013 | |
| JP | 60046892 B1 | 3/1985 | |
| JP | H02220314 A | 9/1990 | |
| JP | 10282450 A | 10/1998 | |
| JP | H11-231138 A | 8/1999 | |
| JP | 2005-203430 A | 7/2005 | |
| JP | 2006-106227 A | 4/2006 | |
| JP | 2006-285234 A | 10/2006 | |
| JP | 2007-518566 A5 | 7/2007 | |
| JP | 4112355 B2 | 7/2008 | |
| JP | 2008-281395 A | 11/2008 | |
| JP | 2009-193070 A | 8/2009 | |
| JP | 2015-500571 A | 1/2015 | |
| JP | 2015-196265 A | 11/2015 | |
| KR | 10-2011-0109957 A | 10/2011 | |
| RU | 2008742 C1 | 2/1994 | |
| RU | 2021881 C1 | 10/1994 | |
| RU | 68715 U1 | 11/2007 | |
| TW | 504425 B | 10/2002 | |
| TW | 553430 U | 9/2003 | |
| TW | 200633062 A | 9/2006 | |
| TW | I271904 | 1/2007 | |
| TW | 200707466 A | 2/2007 | |
| TW | 201307949 A | 2/2013 | |
| WO | 1995/011100 A1 | 4/1995 | |
| WO | 1995/011101 A1 | 4/1995 | |
| WO | 01/74529 A2 | 10/2001 | |
| WO | 2005/053895 A1 | 6/2005 | |
| WO | 2009/054811 A1 | 4/2009 | |
| WO | 2010/029243 A1 | 3/2010 | |
| WO | 2012/088361 A2 | 6/2012 | |
| WO | 2012/102655 A1 | 8/2012 | |
| WO | 2013/086227 A1 | 6/2013 | |
| WO | 2014/179345 A1 | 11/2014 | |
| WO | 2015/146591 A1 | 10/2015 | |
| WO | 2016/059938 A1 | 4/2016 | |
| WO | 2016/085334 A2 | 6/2016 | |
| WO | 2016/156824 A1 | 10/2016 | |

OTHER PUBLICATIONS

Cui, et al., "Calibration of a laser galvanometric scanning system by adapting a camera model," Applied Optics 48 (14):2632-2637 (Jun. 2009).

First Office Action from Chinese Application No. 201410455972.X, dated Jan. 26, 2016, 21 pages (with English translation).

(56) References Cited

OTHER PUBLICATIONS

First Office Action from Chinese Application No. 201480019324.8, dated Apr. 5, 2017, 20 pages (with English translation).

Gardner, "Precision Photolithography on Flexible Substrates," http://azorescorp.com/downloads/ Articles/AZORESFlexSubstrate.pdf (prior to Jan. 30, 2013).

Giannini et al., "Anticipating, measuring, and minimizing MEMS mirror scan error to improve laser scanning microscopy's speed and accuracy," PLoS One, 14 pages (Oct. 3, 2017).

Grigoriyants et al., "Tekhnologicheskie protsessy lazemoy obrabotki," Moscow, izdatelstvo MGTU im. N.E. Baumana, p. 334 (2006).

International Search Report and Written Opinion for International Application No. PCT/US2013/060470, 7 pages, dated Jan. 16, 2014.

International Search Report and Written Opinion for International Application No. PCT/US2014/017841, 5 pages, dated Jun. 5, 2014.

International Search Report and Written Opinion for International Application No. PCT/US2014/017836, 6 pages, dated Jun. 10, 2014.

International Search Report and Written Opinion for International Application No. PCT/US2016/063086, 6 pages, dated Mar. 23, 2017.

International Search Report and Written Opinion for International Application No. PCT/US2017/014182, 9 pages, dated Mar. 31, 2017.

Java-Transform a triangle to another triangle—Stack Overflow, http://stackoverflow.corn/questions/1114257/transform-a-triangle-toanother-triangle?1q= 1, downloaded Feb. 21, 2014, 3 pages.

Kummer et al., "Method to quantify accuracy of position feedback signals of a three-dimensional two-photon laser-scanning microscope," Biomedical Optics Express, 6(10):3678-3693 (Sep. 1, 2015).

Ludtke, et al., "Calibration of Galvanometric Laser Scanners Using Statistical Learning Methods," Bildverabeitung fiir die Medizin, pp. 467-472 (Feb. 25, 2015).

Manakov, et al., "A Mathematical Model and Calibration Procedure for Galvanometric Laser Scanning Systems," Vision, Modeling, and Visualization, 8 pages (Jan. 2011).

Notice of Preliminary Rejection from the Korean Intellectual Property Office for related Application No. 10-2015-7025813, dated Jun. 26, 2018, 18 pages.

Office Action for related Korea Application No. 10-2014-0120247, dated Oct. 18, 2017, 6 pages (with English translation).

Official Letter and Search Report from the Taiwan Intellectual Property Office for related Application No. 102139285, 21 pages, dated Jun. 13, 2016 (w/ English translation.).

Official Letter and Search Report from the Taiwan Intellectual Property Office for related Application No. 103106020, 21 pages, dated Apr. 20, 2016 (w/ Eng. translation).

Official Letter and Search Report from the Taiwan Intellectual Property Office for related Application No. 102139285, 8 pages, dated Nov. 21, 2016 (w/ Eng. translation.).

Official Letter and Search Report from Taiwan Application No. 103130968, dated Dec. 20, 2016, 16 pages (w/ Eng. translation).

Official Letter and Search Report from Taiwan Application No. 103106020, dated Jun. 6, 2017, 7 pages (with English translation).

Official Action (w/English translation) for related Taiwan Application No. 103130968 dated Jun. 7, 2017, 5 pages.

Office Action (no English translation) for related Chinese Application No. 201480022179.9, 5 pages, dated Mar. 30, 2017.

Office Action (w/ English translation) for related Chinese Application No. 201380075745.8, 21 pages, dated Jun. 2, 2017.

Office Action (w/ Eng. translation) for related Korea Application No. 10-2014-0120247, dated Apr. 14, 2017, 11 pages.

PCI-6110, Multifunction I/O Device, http.//www.ni.com/en-ussupport/model.pci-6110.htrnl, downloaded Dec. 15, 2017, 1 page.

Product Brochure entitled "3-Axis and High Power Scanning" by Cambridge Technology, 4 pages, downloaded Dec. 21, 2013.

Product Brochure supplement entitled "Theory of Operation" by Cambridge Technology, 2 pages, downloaded Dec. 21, 2013.

Search Report from the Taiwan Intellectual Property Office for related Application No. 102139285, dated Sep. 1, 2015 (w/ Eng. translation).

Search Report from the Taiwan Intellectual Property Office for related Application No. 102139285, 10 pages, dated Sep. 4, 2017 (w/ English translation).

Second Office Action from Chinese Application No. 201410455972. X, dated Nov. 22, 2016, 22 pages (w/ English translation).

Second Office Action from Chinese Application No. 201480019324. 8, dated Nov. 16, 2017, 21 pages (with English translation).

Second Office Action from Chinese Application No. 201380075745. 8, dated Feb. 26, 2018, 6 pages (with English translation).

Third Office Action from Chinese Application No. 201480019324. 8, dated Apr. 13, 2018, 8 pages (with English translation).

Website describing 3-Axis Laser Scanning Systems at http://www.camtech.com/index.php?option=com_content&view=article&id=131&Itemid=181, 4 pages, accessed Dec. 31, 2014.

Chen et al., "An Algorithm for correction of Distortion of Laser marking Systems," IEEE International Conference on Control and Automation, Guangzhou, China, 5 pages (May 30-Jun. 1, 2007).

Golub, "Laser Beam Splitting by Diffractive Optics," Optics and Photonics News, 6 pages (Feb. 2004).

Spears et al., "In-process sensing in selective laser melting (SLM) additive manufacturing," Integrating Materials and Manufacturing Innovation , 5:2-25 (2016).

Supplementary European Search Report for Application No. EP 17741945.4, 18 pages, dated Nov. 16, 2018.

Thiel et al., "Reliable Beam Positioning for Metal-based Additive Manufacturing by Means of Focal Shift Reduction," Lasers in Manufacturing Conference 2015, 8 pages (2015).

Tofail et al., "Additive manufacturing: scientific and technological challenges, market uptake and opportunities," Materials Today, pp. 1-16 (2017).

Trapp et al., "In situ absorptivity measurements of metallic powders during laser powder-bed fusion additive manufacturing," Applied Materials Today, 9:341-349 (2017).

Xie et al., "Correction of the image distortion for laser galvanometric scanning system," Optics & Laser Technology, 37:305-311 (Jun. 2005).

Zavala-Arredondo et al., "Laser diode area melting for high speed additive manufacturing of metallic components," Materials and Design, 117:305-315 (Jan. 3, 2017).

International Search Report and Written Opinion for International Application No. PCT/US2018/026110, 12 pages, dated Aug. 8, 2018.

Uden et al., "Ultra-high-density spatial division multiplexing with a few-mode multicore fibre," Nature Photonics, 8(11):865-870 (Nov. 2014).

Villatoro et al., "Photonic Crystal Fiber Interferometric Vector Bending Sensor," Optics Letters, 40(13):3113-3116 (Jul. 1, 2015).

Yoda et al., "Beam Quality Factor of Higher Order Modes in a Step-Index Fiber," Journal of Lightwave Technology, 24(3): 1350-1355 (Mar. 2006).

Chen et al., "An On-Machine Error Calibration Method for a Laser Micromachining Tool," Precision Engineering, 47:239-248 (Jan. 31, 2017).

Chiumenti et al., "Numerical Simulation and Experimental Calibration of Additive Manufacturing by Blown Powder Technology," Rapid Prototyping Journal , 23(2), 27 pages (Mar. 20, 2017).

Willis et al., "Printed Optics: 3D Printing of Embedded Optical Elements for Interactive Devices," UIST 12: Proceedings of the 25th annual ACM symposium on user interface softward and technology, 10 pages (Oct. 31, 2012).

Affine Transformation—from Wolfram MathWorld, Retrieved from the internet: <http://mathworld.wolfram.com/AffineTransformation. html>, retrieved on May 21, 2025, 2 Pages.

International Search Report and Written Opinion received for PCT Application No. PCT/US2019/049215, mailed on Nov. 26, 2019, 10 pages.

* cited by examiner

OPTICAL FIDUCIAL GENERATION FOR GALVANOMETRIC SCANNER CALIBRATION

CROSS REFERENCE TO RELATED APPLICATION

This application is a divisional application of and claims priority benefit of U.S. patent application Ser. No. 17/501, 932, filed on Oct. 14, 2021, which is a continuation of and claims priority benefit of U.S. patent application Ser. No. 15/945,550, filed Apr. 4, 2018, which claims the benefit of U.S. Provisional Patent Application Ser. No. 62/481,637, filed Apr. 4, 2017, all which are incorporated by reference herein in their entirety.

FIELD OF THE INVENTION

The field pertains to scanner fiducials and laser processing.

BACKGROUND OF THE INVENTION

In 3D or 2D laser scanner manufacturing or processing application, scanners are typically calibrated for X,Y position according to some external established reference. Most often, a calibration material is situated at the work surf ace and is marked, then inspected by an on-board or off-line vision system to collect error data. The error data is the spatial difference between a reference and actual laser-marked location throughout the scanner field of view.

In additive manufacturing 3D metal printing applications, the laser process poses challenges as to how to provide the reference information throughout the field of view, which can be substantial, such as many cm². A traditional scanning application may provide fiducials on the process substrate or a specially prepared calibration medium that is placed onto the work plane for calibration and that is subsequently removed. Because in 3D Select Laser Sintering (SLS) processes, a finely controlled metal particle layer covers the work plane, fiducial generation is typically not possible or impractical. While the support platen could be made with fiducials for calibration, once a build process begins, in situ drift monitoring becomes difficult due to the print material covering the platen.

SUMMARY OF THE INVENTION

According to an aspect of the disclosed technology, apparatus include an optical source situated to produce a fiducial source beam, and an optical fiducial pattern generator situated to produce with the fiducial source beam at least one transient optical fiducial on a laser processing target that is in a field of view of a laser scanner situated to scan a laser processing beam across the laser processing target, so that a positioning of the laser processing beam on the laser processing target becomes adjustable relative to the at least one transient optical fiducial.

In some embodiments, the laser processing target includes a powder material situated to diffusely reflect the at least one transient optical fiducial, such as with a selective laser sintering target. With some examples, the powder material forms a first layer that is selectively processed with the laser processing beam and additional powder material is deposited to form one or more subsequent layers, wherein the at least one transient optical fiducial is produced at the first layer and at least one of the one or more subsequent layers to provide an in-situ calibration of the scanning of the laser processing beam.

Some apparatus examples also include an optical detector optically coupled to the laser processing target through the laser scanner to a subfield field of view of the field of view based on a scan position of one or more scan optics of the laser scanner, wherein the optical detector is situated to detect the at least one transient optical fiducial in the subfield. According to some examples, the laser scanner is configured to direct the laser processing beam to a predetermined position in the subfield field of view for different scan positions of the one or more scan optics. In different examples, the optical detector includes one or more cameras, photodiodes, CMOS detectors, CCD detectors, arrays, or combinations. In some embodiments, the optical detector is situated to detect the at least one transient optical fiducial while the laser processing beam is unpowered or at a non-processing power.

In some examples, a controller is coupled to the optical detector and the laser scanner and configured to compare the detected position of the at least one transient optical fiducial to a position of the laser processing beam, to update a scan error correction table based on the comparison, and to scan the laser processing beam according to the updated scan error correction table. Representative apparatus can include one or both of the laser scanner and a laser processing beam source situated to generate the laser processing beam and to direct the laser processing beam to the laser scanner.

In some embodiments, the at least one transient optical fiducial is shaped as annulus and the adjustment of the positioning of the laser processing beam relative to the at least one transient optical fiducial is based on a detection of the annulus. The at least one transient optical fiducial can have a wavelength that is spaced apart from a wavelength of the laser processing beam in some examples.

Some examples of the fiducial pattern generator include a diffractive optical element situated to diffract the fiducial source beam into a diffracted beam to produce the at least one transient optical fiducial. With some diffractive optical element examples, the at least one transient optical fiducial can correspond to a plurality of the transient optical fiducials that are spaced apart in a predetermined fiducial pattern in the field of view of the laser scanner. In further examples, the laser scanner can be situated to direct the laser processing beam to different subfields of the field of view that are associated with the positions of the respective transient optical fiducials produced with the diffractive optical element. Some embodiments can further include an optical detector situated to detect a zero-order portion of the diffracted beam that is reflected by the laser processing target or a surface adjacent to the laser processing target.

In some embodiments, the optical source and optical fiducial pattern generator have a spatial separation from the laser scanner and a laser processing beam source situated to generate the laser processing beam that thermally isolates the optical source and optical fiducial pattern generator from the laser scanner and laser processing beam source that reduces a position error of the at least one transient optical fiducial at the laser processing target.

In selected examples, the fiducial pattern generator includes a spatial light modulator situated to modulate the fiducial source beam to produce a modulated beam so that the at least one transient optical fiducial is dynamically positionable across the laser processing target. Spatial light modulators can include one or more of a digital micromirror device, liquid crystal on silicon device, acousto-optic beam deflector, and electro-optic beam deflector, by way of example. In representative modulated beam examples, the at least one transient optical fiducial is dynamically positionable as the laser processing beam is scanned across the laser processing target so that a scan position of the laser processing beam can follow the dynamic position of the at least one transient optical fiducial.

According to another aspect of the disclosed technology, systems include a fiducial calibrator situated to produce at least one transient optical fiducial, at least one processor, and one or more computer-readable storage media including stored instructions that, responsive to execution by the at least one processor, cause the system to adjust a positioning of a laser processing beam relative to the at least one transient optical fiducial detected at a laser processing target that is in a field of view of a laser scanner situated to scan the laser processing beam across the laser processing target.

In some system examples, the at least one transient optical fiducial includes a plurality of transient optical fiducials produced with a diffractive optical element of the fiducial calibrator and directed from the diffractive optical element to the laser processing target along paths that are not common with the laser scanner, wherein causing the system to adjust the positioning corresponds to a beam scanning calibration that includes comparing a detected position of the at least one transient optical fiducial to a position of the laser processing beam, updating a scan error correction table based on the comparison, and controlling the laser scanner to scan the laser processing beam based on values in the updated scan error correction table. In further system examples, the at least one transient optical fiducial includes a dynamically positionable optical fiducial in the field of view of the laser scanner that is directed along an optical path separate from the laser scanner, wherein causing the system to adjust the positioning includes directing the dynamically positionable optical fiducial according to a predetermined laser processing pattern, detecting the dynamically positionable optical fiducial with an optical detector optically coupled through the field of view of the laser scanner, and following the dynamically positionable optical fiducial with the laser processing beam based on the detection.

According to another aspect of the disclosed technology, methods include producing a fiducial source beam with an optical source, and forming at least one transient optical fiducial on a laser processing target that is in a field of view of a laser scanner situated to scan a laser processing beam across the laser processing target, with an optical fiducial pattern generator that receives the fiducial source beam, to adjust a positioning of the laser processing beam relative to the at least one transient optical fiducial.

Some method examples further include detecting the at least one transient optical fiducial with an optical detector optically coupled to the laser processing target through the laser scanner, determining a position difference between the at least one transient optical fiducial and the laser processing beam, and adjusting the positioning of the laser processing beam with the laser scanner in the field of view by reducing the position difference. According to some method examples, the forming the at least one transient optical fiducial includes diffracting the fiducial source beam with a diffractive optical element to produce a plurality of the transient optical fiducial beamlets, and directing the transient optical fiducial beamlets to the laser processing target as a precalibrated array of the transient optical fiducials that are in the field of view of the laser scanner. Additional method examples include detecting the at least one transient optical fiducial with an optical detector optically coupled to the laser processing target through the laser scanner, wherein the forming the at least one transient optical fiducial includes varying a position of the at least one transient optical fiducial on the laser processing target during processing of the target with the laser processing beam, wherein the determining a position difference and adjusting the positioning of the laser processing beam includes following the variable position of the at least one transient optical fiducial with the laser processing beam based on the detection of the at least one transient optical fiducial with the optical detector.

The foregoing and other features and advantages of the disclosed technology will become more apparent from the following detailed description, which proceeds with reference to the accompanying figures.

DESCRIPTION OF EMBODIMENT(S) OF THE INVENTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description some-times uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

Figure 1:
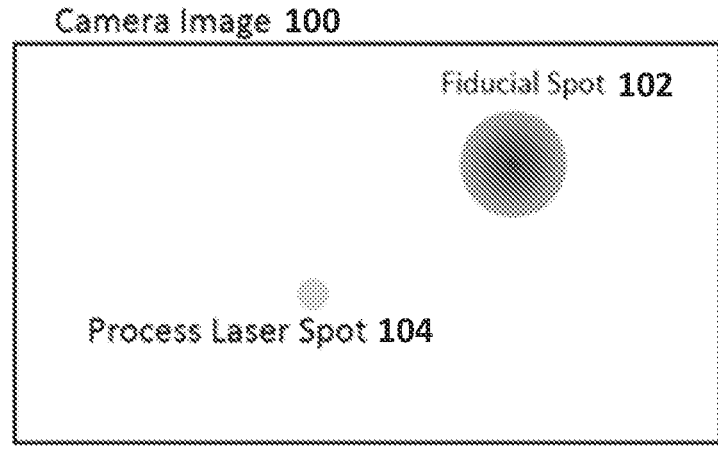
FIG. 1 is a plan view of a camera image of a selective laser sintering target.
Figure 2:
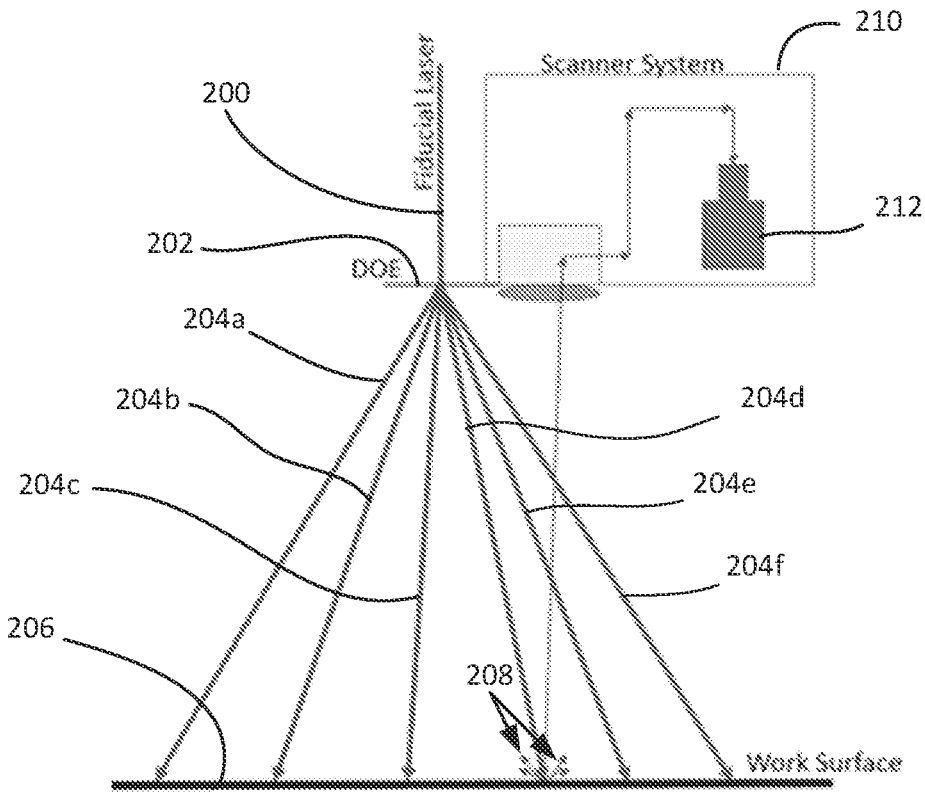
FIG. 2 is a schematic of an example selective laser sintering system that includes a diffractive optical element that generates fiducial markers at a work surface.

In FIGS. 1 and 2, systems and methods are disclosed that provide fiducial projection within a 3D or 2D scanner based processing tool. A low power laser source provides a laser beam 200 that is directed through a single or multi element diffractive optical element (DOE) 202 which splits the single beam into a plurality of beams 204a-204f forming a 2-dimensional grid of beams (e.g., 10-100) that are directed to a work plane of material 206. In the case of SLS, the work plane of material 206 can be a layer of metal powder which also serves to scatter the light from the DOE, such as diffusely into a partially or substantially Lambertian distribution 208. The corresponding array of beams or laser projection points can be viewed from many angles, including through a field of view of a laser scanner 210 situated to direct an SLS processing laser beam to the work plane of material 206. Because DOE fabrication is generally a mature, high-precision process, and because the projection platform of an SLS system can be fabricated to satisfy high flatness requirements, the grid of projection points from the DOE 202 can be positionally well known in relation to the laser scanner 210, the SLS processing laser beam, and other components of the SLS system, including the work plane of material 206. In some examples, a camera system 212 is configured within or is optically coupled through the laser scanner so as to image the work plane of material 206 wherever the laser scanner 210 is commanded within the laser scanner field of view. The camera system 212 can form an image 100 of the local target area directly through the scanning optics of the laser scanner 210. The image 100 contains the illumination fiducial 102 generated by the diffractive optical element 202 and lower power laser source. When the SLS processing laser beam is turned on at low power so as not to damage the SLS powder material, the camera system 212 can then have both the spots 104 of the SLS laser processing beam and the DOE fiducial laser spots 102 in view. The spatial separation between the spots 102, 104 can then be determined and the position of the laser processing beam can be adjusted based on the determined error so as to calibrate the SLS system.

In one example, a two dimensional DOE is situated to split a single beam into a two-dimensional grid of beams each with equal angular spacing. A low power single mode laser beam that can have same or similar wavelength as the SLS processing beam is directed to illuminate the DOE. The DOE can be situated outside of the SLS processing chamber in which the work plane of material is situated, removing the DOE as the reference source from the high temperature conditions that can be associated with the SLS process and that could lead to distorting the reference source.

Figure 3:
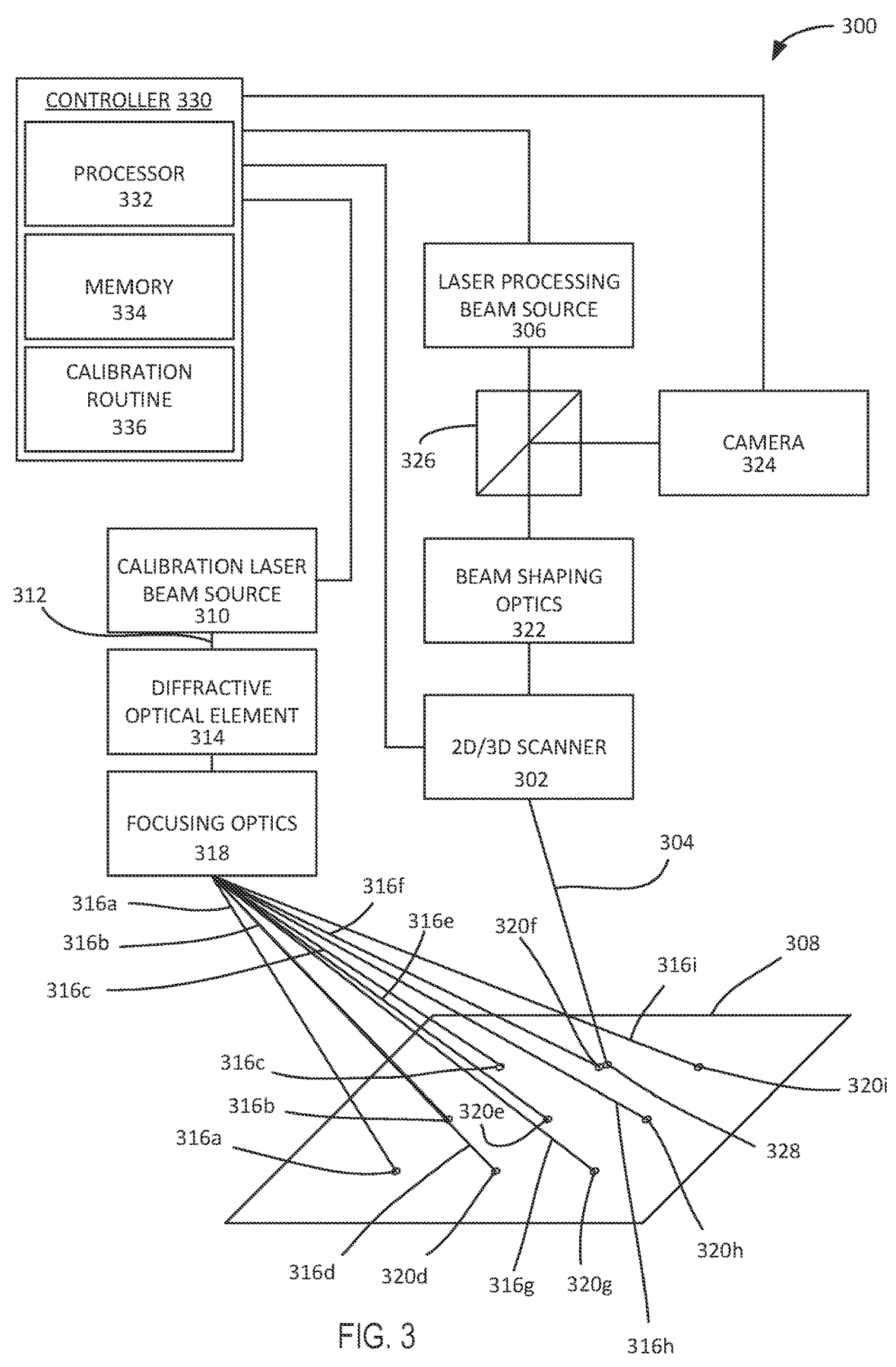
FIG. 3 is another schematic of a selective laser sintering system example.

FIG. 3 shows another example of a laser system 300 that includes a laser scanner 302 situated to direct a laser processing beam 304 generated by a laser processing beam source 306 to a target 308, such as a selective laser melting target. A calibration laser beam source 310 generates a laser beam 312 suitable for fiducial generation through a diffractive optical element 314. The diffractive optical element receives the laser beam 312 and generates a plurality of beamlets 316a-316i that are directed through focusing optics 318 to form an array of fiducial spots 320a-320i, which can be non-permanent, at the target 308. In some examples, the focusing optics 318 provide a suitable depth of focus for the plurality of beamlets 316a-316i so that an out of tolerance z-direction focus variation for the laser processing beam 304 can be detected by a camera 324. Beam shaping optics 322 can be situated to receive the laser processing beam 304 and adjust beam characteristics associated with the laser process (such as SLS) or associated with calibration. One or more of the illuminated non-permanent fiducial spots 320a-320i can be viewed by the camera 324 through the laser scanner 302 and with a beam splitting element 326 that can be situated to receive a cross-section of the laser processing beam 304, a portion of the cross-section, or adjacent to the cross-section. The camera 324 can also view a laser processing beam spot 328, and an image can show whether a positional error exists between the fiducial beamlet location 320f, which can correspond to an expected location of (or expected offset from) the laser processing beam spot, and the actual location 328 of the laser processing beam spot in the field of view. Representative examples optically couple the fiducial beamlets 316a-316i to the target 308 separate from the laser scanner 320 and associated optics 322 so as to thermally isolate the generation of the fiducial reference beamlets 316a-316i from other components of the system. In further examples, the fiducial beamlets 316a-316i can be coupled through focusing optics of the laser scanner 302.

In some examples, detection and calibration of the position of the laser processing beam 304 relative to the position of the fiducial beamlets 316a-316i can be performed during active operation of the laser processing beam 304 at the target 308. A controller 330 typically includes a processor 332, memory 334, and one or more calibration routines 336 or algorithms that can adjust a scanning signal coupled to the laser scanner 302 based on the positional error detected with the camera 324. Various field corrections can be provided including variable corrections across the laser scanner field of view (including in a Z-direction in some examples). For example, error correction tables can be revised and polynomial or other fitting functions that describe the variation of the laser processing beam across the field of view can be updated. Suitable controller types can include one or more computer devices, computing units, CPLDs, PLCs, PLDs, PALs, ASICs, etc., with each typically including one or more of the processors 332 and one or more of the memories 334 for controlling the laser processing beam source 306, camera 324, laser scanner 302, and calibration laser beam source 310. The memory 334 can include volatile memory, such as registers, cache, and RAM, non-volatile memory, such as ROM, EEPROM, and flash memory, or a combination. The memory 334 is accessible by the processor 332 and can store software in the form computer-executable instructions that can be executed by the processor 332, such as the calibration routines 336. The memory 334 can also include removable or non-removable storage including magnetic media, CD-ROMS, DVDs, or any other medium that can be used to store information in a non-transitory way and which can be accessed within the computing environment of the controller 330. In some examples, the controller 330 can be distributed between different components, such as between the calibration laser beam source and the laser scanner 302, and in some examples communication is not required between all components. For example, the calibration laser beam source 310 and diffractive optical element 314 can be configured as a separate fiducial calibration device that can be used for different laser systems to provide calibrating optical fiducials for different laser processing targets. In some examples, a zero positional difference for calibration purposes can correspond to a predetermined positional difference between the laser processing beam spot 328 the fiducial spots 320a-320i as detected by the camera 324.

Figure 4:
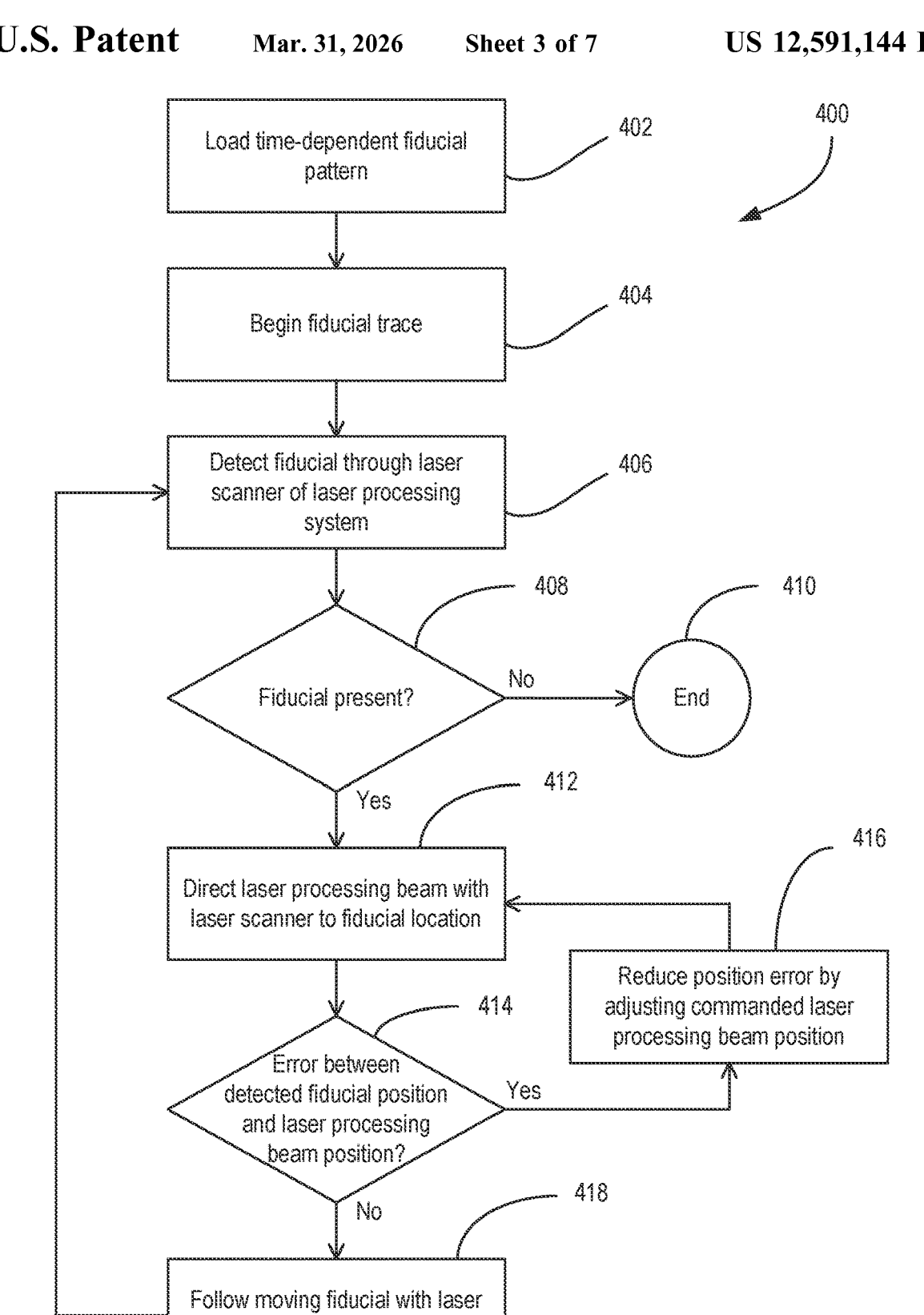
FIG. 4 is a flowchart of an example method of fiducial calibration and dynamic tracking.

FIG. 4 is an example of a dynamic laser processing method 400. At 402, a time-dependent fiducial pattern is loaded into memory of a controller so that the controller can command movement of an optical fiducial, such as with a spatial light modulator that is configured to modulate an incident beam based on the fiducial pattern, across a laser processing target. At 404, a fiducial trace is begun corresponding to the time-dependent fiducial pattern that is applied to a laser processing target. In some examples, the fiducial trace on the laser processing target can correspond to a processed target pattern of a powder layer in a selective laser sintering or other additive manufacturing process. Fiducial trace characteristics can include speed and direction as well as other time-dependent characteristics, such as variation in a fiducial shape or intensity. At 406, an optical detector, such as a camera, photodiode, CMOS, CCD, array, etc., detects the fiducial of the fiducial trace and any associated fiducial characteristics through a laser scanner of a laser system situated to laser process the laser processing target. In some examples, a modulation rate of a fiducial optical intensity or a selected fiducial shape can be associated with an initiation of or change to a predetermined optical power or beam characteristic (including beam shape) of the laser processing beam. At 408, a determination of whether the fiducial is present is made, and if it is not, the process can end at 410. At 412, the laser processing beam is directed to the fiducial location with the laser scanner. At 414, the detected position of the fiducial can be compared with the commanded laser processing beam position. If a position difference exists, at 416, the position difference, corresponding to a scan error associated with a misalignment or a dynamic tracking error associated with following the optical fiducial, can be reduced by adjusting the commanded position of the laser processing beam. In some examples, a scan error correction table can be updated based on the adjustment to the commanded position of the laser processing beam. At 418, the laser processing beam is commanded to follow the moving optical fiducial with the laser processing beam by returning, e.g., by again detecting the fiducial through the laser scanner at 406. The laser processing beam can be scanned to the newly detected position from the previous position of the laser processing beam and detected optical fiducial. In some examples, the fiducial trace can correspond to a welding seam, and the laser processing beam dynamically tracks the fiducial trace to form the seam based on detection of the fiducial through the laser scanner field of view.

Figure 5:
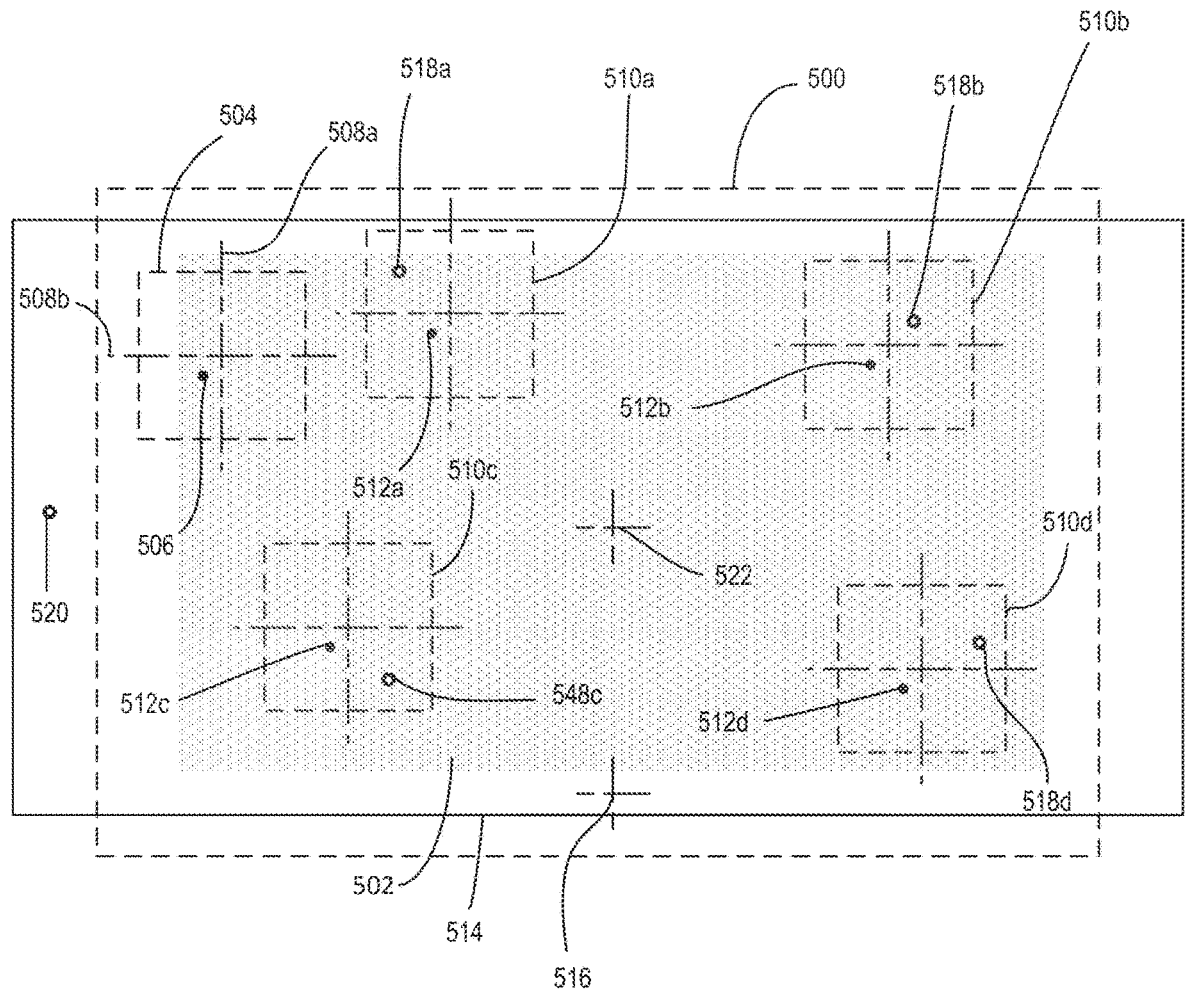
FIG. 5 is a plan view of an example laser processing target.

FIG. 5 shows scanning field of view 500 for a high power laser system, such as for additive manufacturing processes, including selective laser sintering. In typical examples, the field of view 500 is defined by a scan reach of a laser scanner situated to receive and scan a laser processing beam that is generated with a laser source (such as a fiber laser) across a laser processing target 502. The laser scanner typically includes one or more scan mirrors, so that for a camera coupled to an optical path of the laser processing beam between the one or more scan mirrors and the laser source, a subfield field of view 504 can be defined. In the subfield field of view 504, the laser processing beam forms a laser spot 506 at the laser processing target 502 in a predetermined position in the subfield field of view 504 relative to coordinate axes 508a, 508b. As shown, the laser spot 506 is offset from a central position of the subfield of view 504 corresponding to the intersection of the coordinate axes 508a, 508b, though more typically the laser system and laser scanner are precalibrated such that laser spot 506 is directed to the central intersection position of the coordinate axes 508a, 508b.

In selected scan positions of laser scanner, subfield field of views 510a-510d similar to the subfield field of view 504 can be oriented in the scanner field of view at different positions relative to the laser processing target 502. Based on an initial alignment between the laser source and laser scanner, the laser processing beam can form respective laser spots 512a-512d that generally have a common position in the respective subfield field of views 510a-510d at the respective positions. During integration of the laser source and laser scanner with the laser processing target 502 and associated target build plate 514, the reference frame of the laser scanner is aligned and mapped to the laser processing target 502 and build plate 514, such as in relation to a global coordinate system with a defined origin 516. Such an initial calibration can be performed in various ways, including aligning laser scanner positions based on permanent fiducial marks on the build plate 514, with a calibration glass plate and coordinate measurement machine, or with other techniques, including those disclosed herein. For example, a plurality of optical fiducials 518a-518d can be transiently formed on the laser processing target 502 in accurate predetermined locations relative to the global coordinate system and origin 516, and the laser scanner and laser source can be adjusted such that the laser spots 512a-512d become aligned with the transient optical fiducials 518a-518d. The transient optical fiducials 518a-518d can have various shapes, such as spots, lines, grids, cross-hairs, and annulus, though the annular shape shown in FIG. 5 is generally associated with a more rapid and/or accurate detection by an optical detector.

During the life of the laser processing system (i.e., that includes the laser source and laser scanner), or even during laser processing of one of the laser processing targets 502, displacement errors can develop between the positions of the laser spots 512a-512d and the transient optical fiducials 518a-518d and across the field of view of the laser scanner, resulting in imprecisely processed targets. In representative examples, the transient optical fiducials 518a-518d are detected through the laser scanner subfield field of views 510a-510d and the displacement errors are determined and corrected so that the laser processing target 502 can be accurately processed with the laser processing beam. In typical examples, in-situ adjustments of the laser scanner scanning command table can be performed between layers of material to be laser processed to preserve laser scanning accuracies of better than 100 μm, 10 μm, or even 1 μm. In some examples, the transient optical fiducials 518a-518d can correspond to a diffraction pattern generated with a diffractive optical element, such as a diffractive beam splitter having a predetermined pattern on a transmissive layer of material. In typical examples, the placement of the transient optical fiducials 510a-510d can have a robustness of accuracy during or between laser processing based on a spatial separation and thermal isolation of the fiducial generator with respect to the laser scanner. In some examples, the spatial separation can include an air separation, an adjoining boundary with the laser scanner or other components, or a thermal isolation provided with insulating material, a cooling system, etc.

In some examples, perpendicular alignments of the build plate 514, laser processing target, and the field of view 500 relative to a zero-order axis of the fiducial generator, can allow generation of a zero-order diffraction fiducial 520 that can be spaced apart from a center axis 522 of the laser scanner. In selected examples, the zero-order diffraction fiducial 520 is outside of the field of view 500. To maintain an internal accuracy of the fiducial generator, the zero-order diffraction fiducial 520 can be detected and a shift or intensity variation can correspond to an out-of-tolerance condition.

Figure 6:
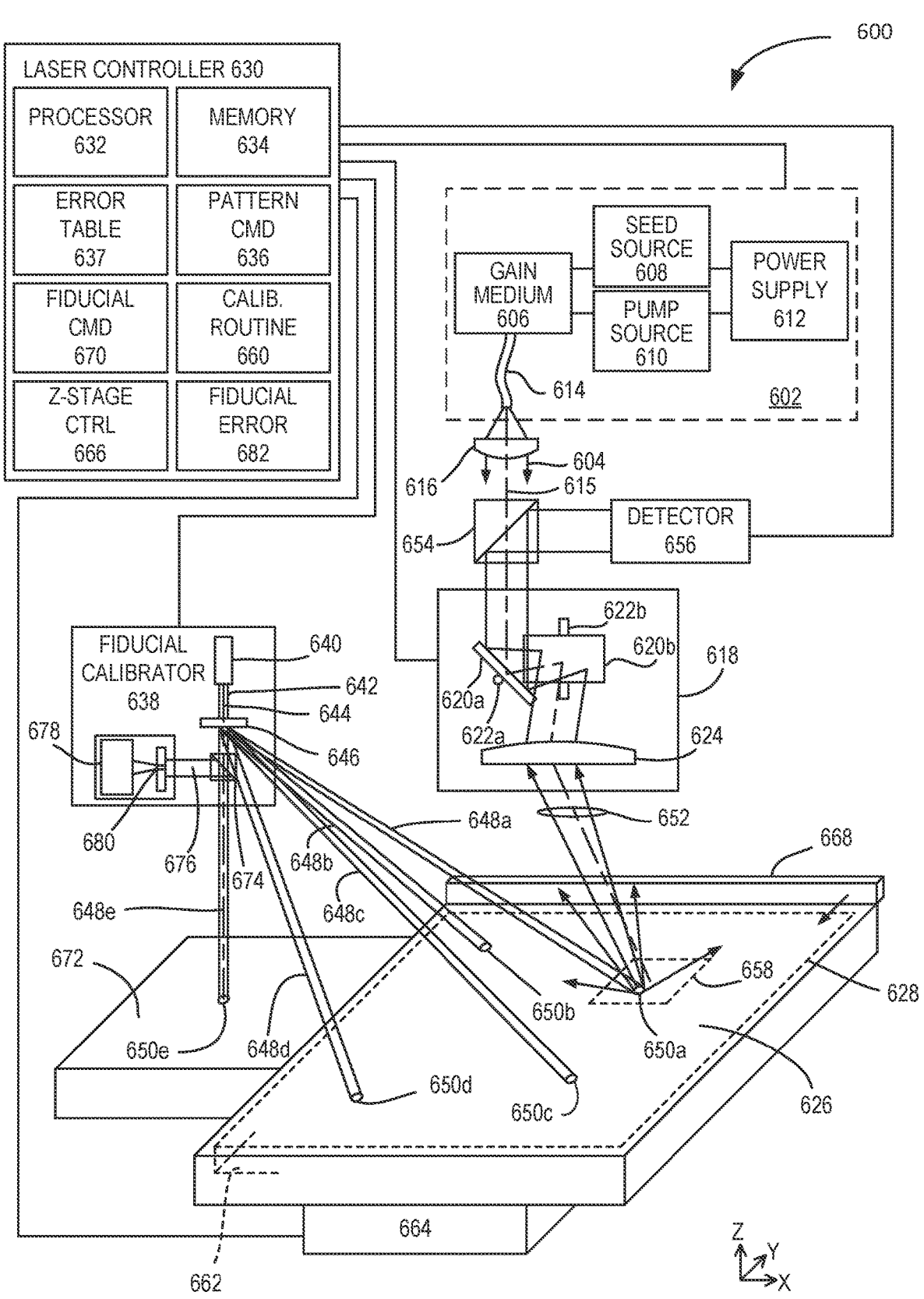
FIG. 6 is a schematic of a laser system example.

In FIG. 6, a laser system 600 includes a laser source 602 situated to generate a laser processing beam 604. The laser processing beam 604 is typically a high power continuous, quasi-continuous, or pulsed beam. In some examples, the laser source 602 includes a gain medium 606, such as an actively doped optical fiber amplifier, fiber oscillator, or fiber oscillator-amplifier combination, solid state block, or a plurality of semiconductor laser sources (e.g., single-emitter laser diodes, laser diode bars, etc.). In a representative embodiment, the gain medium 606 is an active fiber that is coupled to a seed source 608, such as a diode laser or fiber oscillator, and to a pump source 610, such as one or more fiber-coupled laser diode modules or fiber laser sources. A power supply 612 is coupled to the pump source 610 and seed source 608 (if present) to provide an electrical power source. The gain medium 606 can be coupled to a delivery fiber 614 that delivers to a predetermined location the laser processing beam 604 is emitted and propagates along an optical axis 615 that can correspond to a chief ray of the laser processing beam 604. One or more beam shaping optics, such as a collimation optic 616. The laser processing beam 604 is directed to a 2D or 3D galvanometric laser scanner 618 that typically includes one or more galvanometer scan mirrors 620a, 620b that are situated to rotate about respective scan mirror rotation axes 622a, 622b to change direction of the laser processing beam 604 as incident on a laser scan optic 624. The laser scan optic 624 or one or more other optics of the laser scanner 618 can be translated along the axis 615 to provide a z-focus adjustment. The laser processing beam 604 is then directed to a selected position on a laser processing target 626 based on a deflection of the optical axis 615 with the galvanometer scan mirrors 620a, 620b, and z-position with the other optics of the laser scanner 618. In representative examples, a focus in the z-direction is typically more tolerant of errors than XY positions because a depth of focus provided by the laser scanner 618 is typically many tens of microns. Thus, after an initial calibration, there is typically a reduced need for periodic z-calibration.

The laser scanner 618 is generally configured to rotate the scan mirrors 620a, 620b so that the laser processing beam 604 can be directed to a predetermined area corresponding to a field of view 628, or regard, of the laser scanner 618. To selectively provide the laser processing beam 604 at different locations in the field of view 628, the laser scanner 618 and the laser source 602 are coupled to a laser controller 630. The laser controller 630 typically includes at least one processor 632 and one or more memories 634 configured with instructions, such as a pattern command file 636, executable by the at least one processor 632 to control beam initiation, termination, power level, repetition rate, modulation, and/or other characteristics of the laser processing beam 604 as received by the target 626 and to control beam scan position in the field of view 628. During an initial calibration, the scan positions in the field of view 628, corresponding to the reference frame of the laser source 602, are mapped to the area of the target 626 so that the intended beam positions associated with the pattern command file 636 can correspond to actual beam positions on the target 626 within a predetermined lateral tolerance and/or z-tolerance (i.e., including into or out of the plane of the target 626). The mapping typically includes the generation of an error table 637 that can include scalar correction values that provide correspondence between the field of view 628 and a global coordinate system defined for the target 626.

During laser processing of the target 626 with the laser processing beam 604, manipulation of the target 626 (e.g., loading, layering, removal, moving, etc.), extended use, change in environment conditionals, optical and/or mechanical degradation, routine maintenance, etc., the scanning tolerances associated with the initial calibration can deteriorate such that the commanded scan positions are not sufficiently accurate with respect to the target 626. A fiducial calibrator 638 can be situated in a predetermined spatial and directional relationship with respect to the target 626. The fiducial calibrator 638 can include a calibration laser source 640 situated to generate a fiducial source beam 642. The fiducial source beam 642 is typically a low power beam that can be of relatively high quality (e.g., $M^2 \leq 5$, $M^2 \leq 2$, $M^2 \leq 1.2$, etc.), and typically at a wavelength offset from a wavelength of the laser processing beam 604. In some examples, the fiducial source beam 642 can have a same or similar wavelength as the laser processing beam 604.

In typical examples, the fiducial source beam 642 is directed as a collimated beam along an optical axis 644 to a fiducial pattern generator 646, such as a diffractive optical element. The fiducial pattern generator 646 diffracts the fiducial source beam 642 into a plurality of fiducial beamlets 648a-648e that form respective optical fiducials 650a-650e that are generally transient and that have a predetermined positional relationship with the target 626. In representative examples, the target 626 includes a powder material, such as a material suitable for selective laser sintering or another additive manufacturing process, that is non-specular so as to provide a range of reflections (such as with a Lambertian or partially Lambertian profile) for incident light. The optical fiducials 650a-650d can be formed on this material and provide a corresponding a range of reflections, such as that shown by the different arrows directed away from the optical fiducial 650a. In general, the non-specular reflections are diffusive enough to provide sufficient scatter across the angle subtended between the fiducial pattern generator 646 (or other related coupling optic) and the laser scan optic 624.

A reflected fiducial portion 652 of the reflections of the optical fiducial 650a can be coupled through the laser scan optic 624 and reflect off the scan mirrors 620a, 620b. A beam splitter 654 or other suitable wavelength-dependent beam-directing optic can be situated in the path of the laser processing beam 604 to receive and direct the reflected fiducial portion 652 (e.g., through reflection, refraction, transmission, a combination, etc.) to an optical detector 656, such as a camera, one or more photodiodes, CCDs, CMOS sensors, arrays, etc. In representative examples, the optical detector 656 has a movable field of view 658 that is defined by the optical path between the optical detector 656 and the target 626, including the scan position and mirror areas of the scan mirrors 620a, 620b. In typical embodiments, the field of view 658 of the optical detector 656 is optically aligned with respect to the propagation axis 615 such that a center of the field of view 658 corresponds to the position of the spot of the laser processing beam 604 at the target 626 during processing, though other alignments are possible. The controller 630 can be coupled to the fiducial calibrator

638 and the optical detector 656 to cause the fiducial calibrator 638 to generate the optical fiducials 650a-650d and to receive a detection signal from the optical detector 656. The received detection signal can correspond to detected optical characteristics of the optical fiducial 650a with the field of view 658 positioned in view of optical fiducial 650a, or detected optical characteristics of the optical fiducials 650b-650d with the scan mirrors 620a, 620b moved so that the field of view 658 moves to be in view of the respective optical fiducials 650b-650d. In representative embodiments, the fiducial calibrator 638 is sufficiently thermally separated from the laser scanner 618 and laser source 602 to reduce a position error of the optical fiducials 650a-650d at the target 626, e.g., through spatial separation and/or thermal cooling of the fiducial calibrator.

In some examples of the laser system 600, the target 626 can include a build plate base 662 that is lowered with a z-stage 664 with a z-stage control 666 of the controller 630. A layer of powder material is provided above the build plate base 662 and a pushing bar 668 can be used to flatten the surface of the powder material and remove excess material so that the top of the powder layer corresponds with a predetermined plane for a focus of the laser processing beam 604 at the target 626. After processing of a particular powder layer with the laser processing beam 604 (such as according to a selective laser sintering process), the build plate base 662 can lower with the z-stage 664 and an additional layer of powder can be deposited and flattened so that the additional layer can be processed with the laser processing beam 604. In some embodiments, the z-stage 664 can also provide x, y, or xy translation, or can include a conveyor system that translates the target 626. In representative examples, a calibration routine 660 can be performed with the controller 630 at a manually selected time, or during one or more automatically selected times or intervals, including at a start or end of a process, during laser processing with the laser processing beam 604, or between laser processes or processing steps, such as between processing of layers of powder material. In some examples, the calibration routine 660 can include a fiducial command 670 that includes causing the fiducial calibrator 638 to produce the optical fiducials 650a-650d at the target 626. In further examples, the optical fiducials 650a-650d can be transiently directed to the target 626 while one or more components of the laser system 300 is powered. During the calibration routine 660, the scan mirrors 620a, 620b are directed to predetermined positions associated with the optical fiducials 650a-650d, and the optical detector 656 detects the position of the optical fiducials 650a-650d in the field of view 658 at each position. Based on the detected positions, a positional error can be determined, and the error correction table 637 can be updated, typically using one or more interpolation/extrapolation techniques, to determine suitable correction values for other scan positions in the field of view 628.

In some embodiments, the fiducial beamlet 648e generated with the fiducial calibrator 638 can correspond to a zero-order diffraction produced by the fiducial pattern generator 646. The optical fiducial 650e can be formed on a separate surface 672 adjacent to the target 626, or can be formed on the target 626 in some examples. In some examples, a beam splitter 674 can be situated to direct a portion of a reflected beam 676 that is received from the surface 672 to an optical detector 678, e.g., through a pinhole aperture 680. In some examples, other beam directing optics (or no beam directing optics) that are not situated in the path of the fiducial beamlet 648e can be used instead of the beam splitter 674. Misalignments or alignment variations between the fiducial calibrator 638 and the surface 672 and target 626 can be detected based on a variation in the detected zero-order reflected beam 676, such as a drift in reflected beam position which can correspond to an angular variation of the surface 672 relative to the fiducial beamlet 648e. The optical detector 678 can be coupled to the laser controller 630 and a fiducial error detection routine 682 can form an interlock with operation of the laser source 602, can indicate a misalignment exists, or that the fiducial calibrator 638 has accrued a decrease in fiducial accuracy, by way of example.

Figure 7:
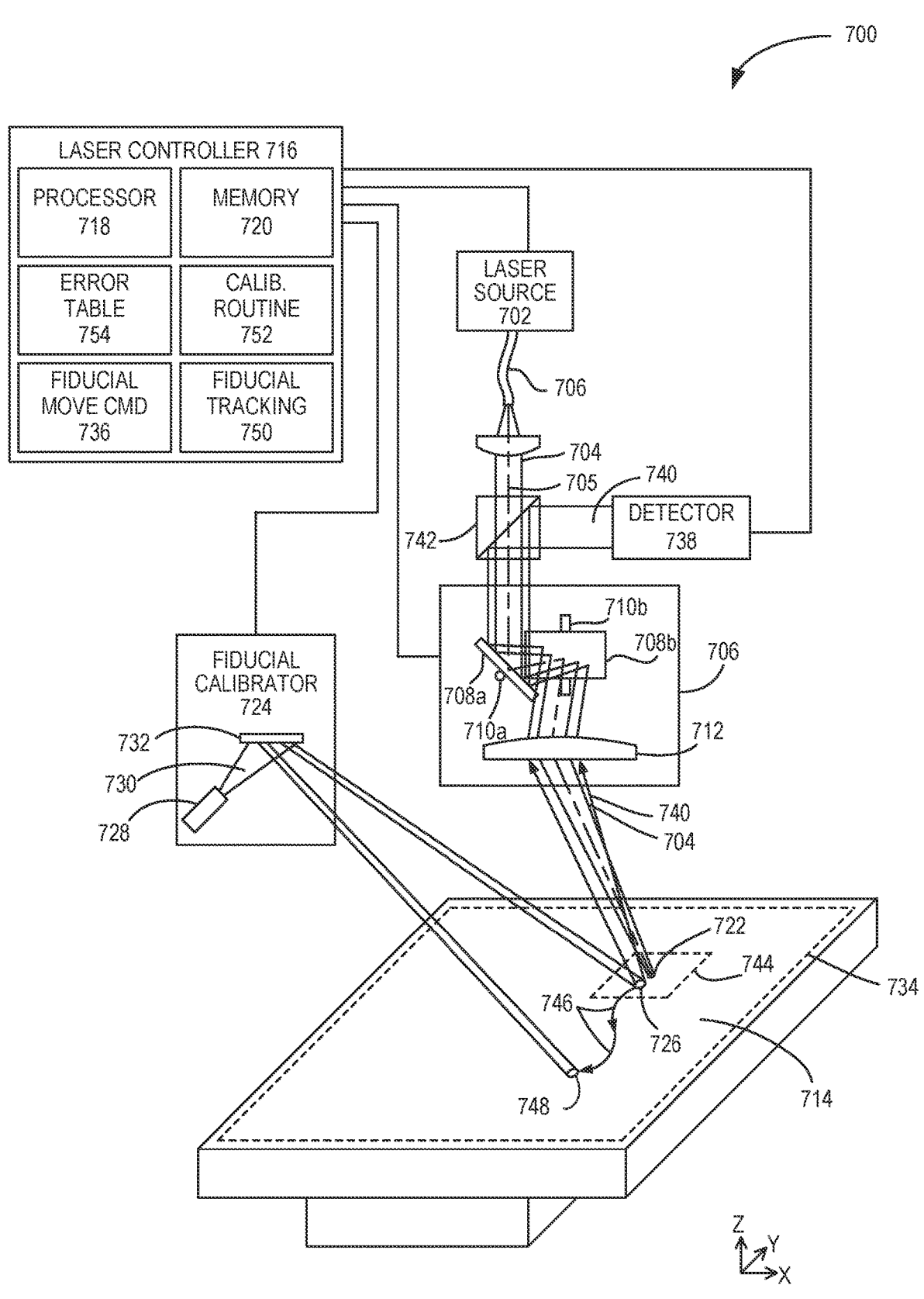
FIG. 7 is a schematic of another laser system example.

FIG. 7 is a laser system 700 that is configured for dynamic transient optical fiducial placement and tracking. The laser system 700 includes a laser source 702 situated to produce a laser beam 704, which is typically emitted from a delivery fiber 706. In some examples, the laser beam 704 coupled via free-space, a beam homogenizer, and/or other optics. The laser beam 704 is directed along a propagation axis 705 to a laser scanner 706 that includes a pair of scan mirrors 708a, 708b generally rotatable about respective orthogonal axes 710a, 710b with galvanometer actuators to change a direction of the received laser beam 704. A focus optic 712 receives the laser beam 704 and focuses the laser beam 704 a laser processing target 714, such as a welding target, cutting target, patterning target, selective laser sintering target, additive manufacturing target, etc. A laser controller 716 is coupled to the laser source 702 and the laser scanner 706 to control beam characteristics of the laser beam 704, such as power, wavelength, repetition rate, spot intensity/divergence profile and/or geometry, etc. The laser controller typically includes at least one processor 718 and at least one memory 720 configured with various instructions and data storage so that the processor 718 in response to the instructions in the memory 720 can cause the laser source 702 to emit the laser beam 704 and cause the laser scanner 706 to vary a scan position so that the laser beam 704 forms a laser spot 722 at the laser processing target 714.

In representative examples, the laser system 700 also includes fiducial calibrator 724 situated to direct an optical fiducial 726 to, and change a fiducial position at, the laser processing target 714. The fiducial calibrator 724 can be situated separately from the laser scanner 706, though the spatial separation can be vary in different examples. For example, the fiducial calibrator 724 can be mechanically attached to the laser scanner 706 or situated in close proximity to the laser scanner 706, though the fiducial calibrator 724 is typically configured with a sufficiently separate spatial distance and/or coupling such that a calibration between the fiducial calibrator 724 and the laser processing target 714 remains unchanged or varies independently from a calibration decrease between the laser scanner 706 and the laser processing target 714. In some examples, the fiducial calibrator 726 includes an optical source 728, such as a laser, LED, etc., situated generate a fiducial source beam 730, and a spatial light modulator 732 situated to receive and spatially modulate the fiducial source beam 730 to selectively provide the optical fiducial 726 in a selective position across a field of regard 734 or a portion of the field of regard 734 that corresponds to a scan reach of laser beam 704 with the laser scanner 706. Suitable examples of the spatial light modulator 732 include a digital micro-mirror device (DMD), liquid crystal on silicon (LCoS) device, acousto-optic modulator, or electro-optic modulator, by way of example. The laser controller 716 is coupled to the fiducial calibrator 724 and configured with a fiducial movement command 736 to change the position of the optical fiducial 726. In some examples, the fiducial movement command 736 and the fiducial calibrator 724 can be coupled to a separate controller that is not in communication with the laser controller 716.

An optical detector 738 is situated to receive a reflected beam portion 740 of the optical fiducial 726. In typical examples, the laser processing target 714 has a surface that does not produce an exclusively specular reflection such that a portion of light reflected by laser processing target 714, corresponding to the reflected beam portion 740, is directed through the laser scan optic 712 and the scan mirrors 708a, 708b, to a selective optic 742 that directs the reflected beam portion 740 to the optical detector 738. The optical detector 738 can have a field of view 744 that can be defined in part by the position of the scan mirrors 708a, 708b. The optical detector 738 can detect the laser spot 722 and the optical fiducial 726, and the laser controller 716 can receive the detection signal to determine a positional difference between the laser spot 722 and the optical fiducial 726. In some examples, the laser spot 722 is aligned with a predetermined position (e.g., a center) in the field of view 744 and the positional difference is determined based on the predetermined position and the detected position of the optical fiducial 726. The laser controller 716 can be provided with an expected position of the laser spot 722 based on the fiducial movement command 736. In some examples, the laser controller 716 can command the laser scanner 706 through a range of scan positions to detect the optical fiducial 726 in the field of regard 734.

With the fiducial movement command 736 the position of the optical fiducial 726 can be changed to follow a time-dependent processing trace 7 46 to a different position, forming the displaced optical fiducial 748. The laser controller 716 can include a fiducial tracking command 750 that causes the laser controller 716 to adjust a scan position of the laser spot 722 to a new position that reduces the positional difference between the optical fiducial 726 and the laser spot 722. The adjustment is typically performed in real-time so that the laser spot 722 can follow the time-dependent processing trace 746. In some examples, various closed-loop control methods can be used to provide convergence or substantial reductions in position errors to allow the laser spot 722 to follow the optical fiducial 726 to the new position of the optical fiducial 748, including but not limited to PID, Pl, lead-lag, etc. The detected positions of the optical fiducial 726 and later positions of the optical fiducial, such as along the processing trace 746, can be stored in the memory 720 so that the laser beam 704 can be moved to positions after the optical fiducial has moved or is no longer in the field of regard 734 or the field of view 744. The fiducial tracking command 750 can also cause the laser source 702 or associated beam shaping optics to adjust characteristics of the laser spot 722, such as diameter, shape, irradiance, etc., based on changes between the detected optical fiducials 726, 748. By way of example, beam shaping optics can include fiber-based beam shaping, zoom expansion, relative movement of lenses, mirrors, or other optical components that vary a beam characteristic. In some examples, the laser processing target 714 can include a plurality of adjacent subtargets and the time-dependent processing trace 746 can follow along a boundary of the adjacent subtargets.

The fiducial calibrator 724 can also be configured with the laser controller 718 and the optical detector 738 to provide a calibration routine 752 that can provide scan rotation correction values (e.g., rotation increments for the scan mirrors 708a, 708b) for scanning of the laser beam 704 across the field of regard 734. For example, the fiducial calibrator 724 can direct optical fiducials to predetermined calibration locations in the field of regard 734, such as to the positions shown for the optical fiducials 726, 748, or other locations. With the laser beam 704 (or laser scanner 706) commanded to the position of the optical fiducials 726, 748, the optical detector 738 can detect a position difference between the respective optical fiducials 726, 748 and a spot of the laser beam 704 or a predetermined position in the field of view 744 of the optical detector 738. The laser controller 716 can include a scan actuator error correction table 754 that can include scan actuator bit corrections for the scan mirrors 708a, 708b so that the laser beam 704 can form the laser spot 722 in locations in the field of regard 734 that accurately correspond to global coordinates of the laser processing target 714. In some examples, the laser scanner 706 can include scanning capability in the z-direction and the error correction table 754 can also include scan actuator bit corrections for the z-direction. The scan actuator error correction table 754 can be updated with error correction values based on the positional differences detected and determined with the calibration routine 752. The detector 738 can detect positional errors, such as a variation in focus based on change in fiducial spot size or blur associated with defocus.

Figure 8:
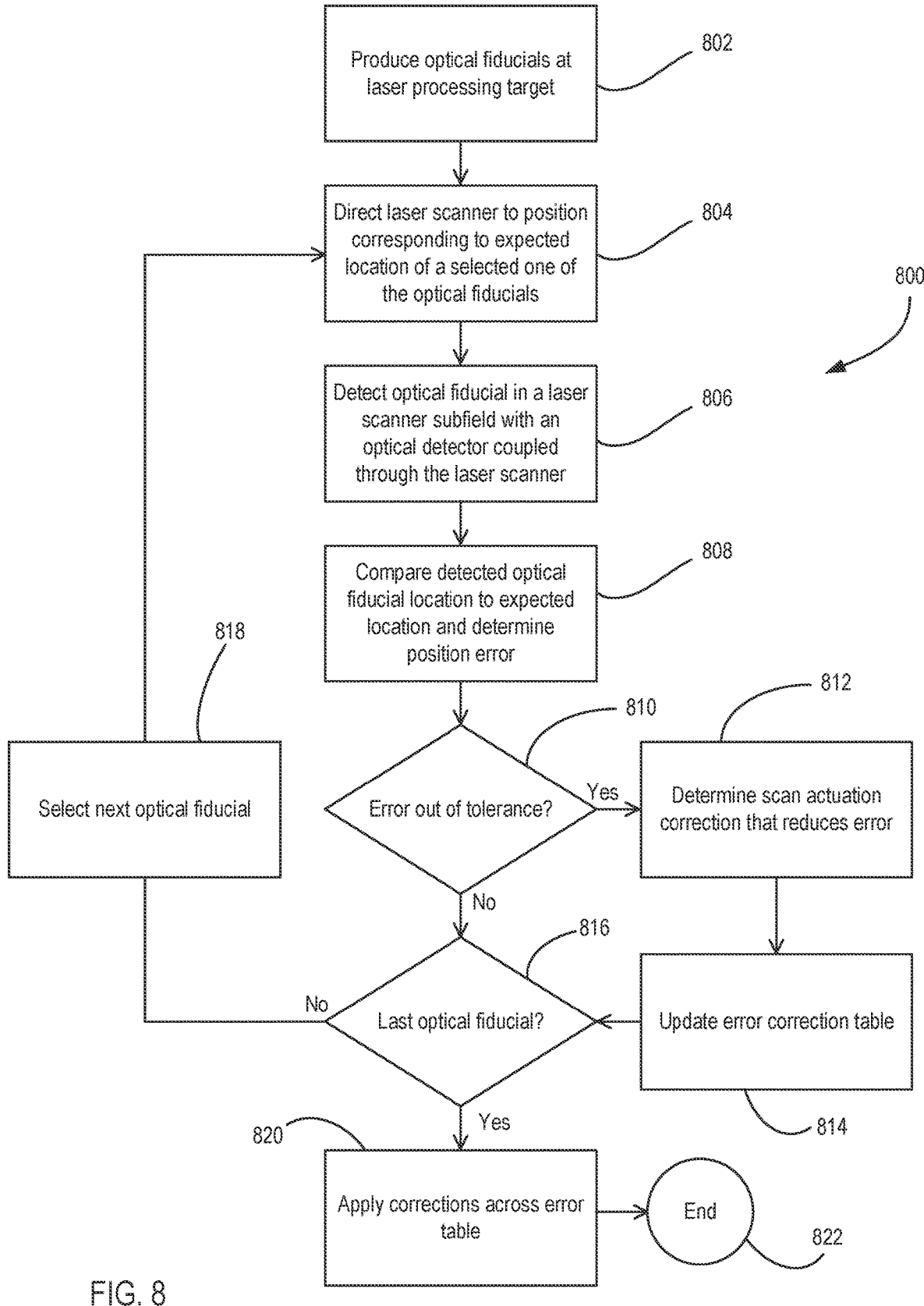
FIG. 8 is a flowchart of an example calibration method with optical fiducials.

FIG. 8 is a method 800 of calibrating a laser processing target and laser system with a fiducial calibrator. At 802, a plurality of optical fiducials are generated with the fiducial calibrator and directed to a laser processing target, typically along an axis separate from an associated laser scanner situated to scan a laser processing beam of the laser system in relation to the target (e.g., along X, Y, and/or Z directions). In representative examples, the optical fiducials are generally transiently generated such that the surface of the laser processing target is not permanently marked by the optical fiducials or such that the laser processing target need not be permanently marked for calibration and/or detection based on the optical fiducials. At 804, the laser scanner is commanded with a laser controller to direct the laser processing beam at a process power, at a low power, or unpowered to a position in a field of regard of the laser scanner that corresponds to the expected location of a selected one of the plurality of optical fiducials. At 806, the selected one of the optical fiducials is detected in a subfield of the field of regard of the laser scanner with an optical detector (such as a camera) based on the optical coupling to the laser processing target of the optical detector through the laser scanner. At 808, the laser controller compares the detected optical fiducial location with the expected location and determines a position error, such as one or more of an X, Y, and Z position error.

At 810, the laser controller checks if the determined position error is outside of a tolerance condition, such as less than 50 μm, 20 μm, 10 μm, 5 μm, 3 μm, 1 μm, etc. If the position error is out of tolerance, at 812, the controller determines a scan actuation correction for the laser scanner that reduces the error. At 814, an error correction table is updated in the laser controller with the correction that produces the error reduction for the commanded position of the laser scanner and laser processing beam. At 816, a check is performed as to whether the last optical fiducial of the plurality of optical fiducials has been detected and compared, and can also be performed if the check for an error of a selected optical fiducial yield an in-tolerance condition. If there are additional optical fiducials to be checked, at 818, another of the plurality of optical fiducials can be selected and the process steps 804 onward can be performed until all optical fiducials are detected and analyzed. After all optical fiducials are detected and the error correction table is updated with corrections based on the position errors associated with the optical fiducials, additional corrections can be applied for other areas or regions in the field of regard of the laser scanner where optical fiducials were not directed and the error table can be updated with new correction values or new values associated with correction values. In representative examples, the additional corrections for other positions in the field of regard can be determined with linear or curve fitting algorithms based on the corrections associated with the optical fiducials. Suitable methods of correcting scan actuation values include those disclosed in U.S. patent application Ser. No. 15/410,612, entitled "Method of processing calibration data in 3D laser scanner systems," which is incorporated by reference herein in its entirety. Corrections can be applied across the field of regard of the laser scanner at different nodes (e.g., forming one or more grids of x, y, and/or z coordinates) based on higher order polynomials fit to the corrections or derivatives of such functions. An initial set of corrections can be provided based on a computational model characterizing the laser scanner and optics associated with direct the laser processing beam to the target. Corrections for non-nodal locations can be determined from interpolation between adjacent correction nodes.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

What is claimed is:

1. A method, comprising:

producing a fiducial source beam with an optical source; and using an optical fiducial pattern generator, producing with the fiducial source beam at least one transient optical fiducial on a laser processing target made of powder material that is in a field of view of a laser scanner situated to scan a laser processing beam across the laser processing target, wherein the optical fiducial pattern generator is coupled to the laser scanner so that a positioning of the laser processing beam with the laser scanner becomes adjustable relative to the positioning of the at least one transient optical fiducial in the field of view of the laser scanner.

2. The method of claim 1, further comprising:

detecting the at least one transient optical fiducial with an optical detector optically coupled to the laser processing target through the laser scanner;

determining a position difference between the at least one transient optical fiducial and the laser processing beam; and adjusting the positioning of the laser processing beam with the laser scanner in the field of view by reducing the position difference.

3. The method of claim 1, wherein the producing with the fiducial source beam the at least one transient optical fiducial includes:

diffracting the fiducial source beam with a diffractive optical element to produce a plurality of transient optical fiducial beamlets; and directing the plurality of transient optical fiducial beamlets to the laser processing target as a precalibrated array of the at least one transient optical fiducial in the field of view of the laser scanner.

4. The method of claim 2, further comprising:

detecting the at least one transient optical fiducial with an optical detector optically coupled to the laser processing target through the laser scanner;

wherein the producing with the fiducial source beam the at least one transient optical fiducial includes varying a position of the at least one transient optical fiducial on the laser processing target during processing of the target with the laser processing beam; and wherein the determining a position difference and adjusting the positioning of the laser processing beam includes following a variable position of the at least one transient optical fiducial with the laser processing beam based on the detection of the at least one transient optical fiducial with the optical detector.

* * * * *